United States Patent Office 3,440,740
Patented Apr. 29, 1969

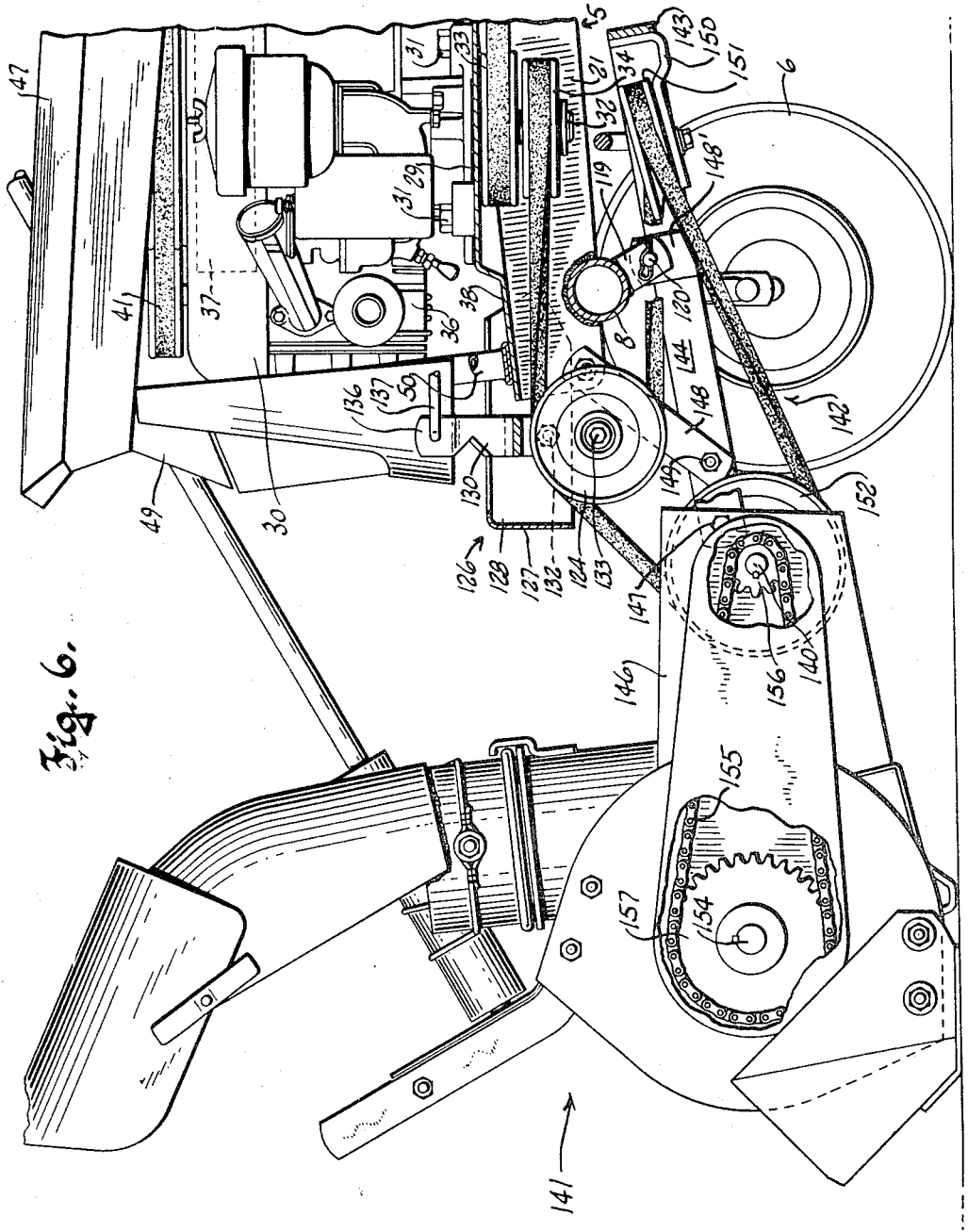

3,440,740
RIDING TRACTOR WITH POWER TAKEOFF PULLEY MEANS
Igor Kamlukin, Fox Point, Wis., assignor to Simplicity Manufacturing Company, Inc., Port Washington, Wis., a corporation of Wisconsin
Original application Sept. 9, 1963, Ser. No. 307,382, now Patent No. 3,311,186, dated Mar. 28, 1967. Divided and this application Oct. 12, 1966, Ser. No. 586,253
Int. Cl. E01h 5/00; B60k 5/00; A01d 35/26
U.S. Cl. 37—43          6 Claims

ABSTRACT OF THE DISCLOSURE

A tractor having a power takeoff pulley and a single belt to transmit driving torque from the power takeoff pulley to the input pulley of an implement draft coupled to the tractor. The belt is trained over a pair of idler pulleys that are bodily movable from a tight belt driving position to a slack belt non-driving position to thus achieve a "clutching" and "declutching" effect for the implement.

---

This invention relates to improvements in so called garden type riding tractors like that disclosed in my copending application Ser. No. 48,239, filed Aug. 8, 1960, Patent No. 3,187,821. This application is a division of my copending application Ser. No. 307,382, filed Sept. 9, 1963 and since issued as Patent No. 3,311,186.

Tractors of the type here under consideration are usually powered by a single cylinder air cooled internal combustion engine, and they are intended to pull and/or push various attachments or implements that may be readily tractively coupled to the tractor chassis. Certain implements which have rotatable or otherwise movable work performing elements may be driven from the tractor engine through suitable power take off means ordinarily provided for that purpose.

In general, the objects of this invention are to simplify and improve the construction of riding tractors of the character described for the purpose of achieving compactness, low center of gravity and silhouette, and easily accessible power take off means for transmitting driving torque from the power source of the tractor to the work performing elements of implements that may be tractively coupled to the tractor.

With these and other objects in view which will appear as the description proceeds, this invention resides in the novel construction, combination and arrangement of parts substantially as hereinafter described and more particularly defined by the appended claims, it being understood that such changes in the precise embodiment of the herein-disclosed invention may be made as come within the scope of the claims.

The accompanying drawings illustrate several complete examples of the physical embodiments of the invention constructed according to the best modes so far devised for the practical application of the principles thereof, and in which.

Figure 5:
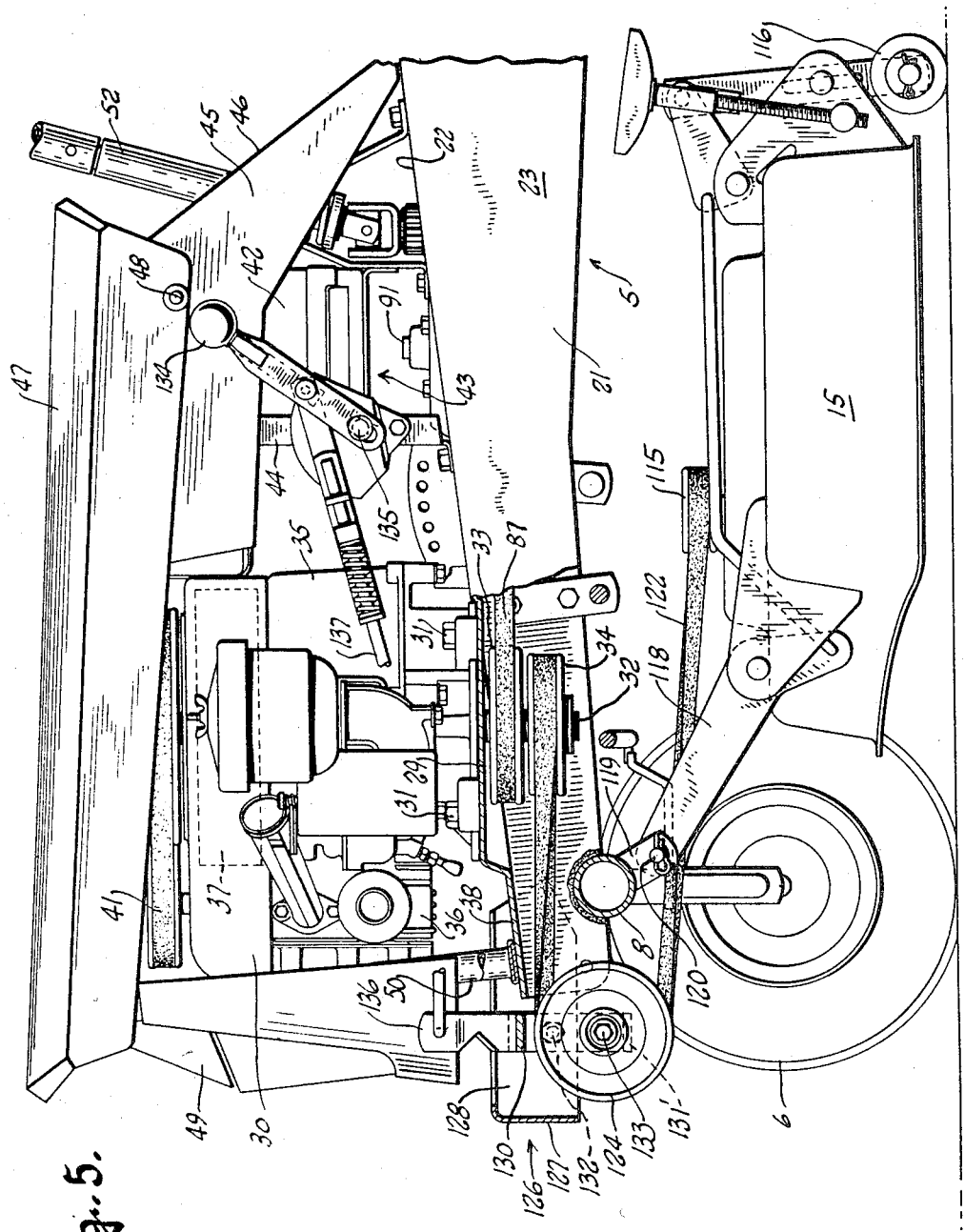

FIGURE 5 is an enlarged side elevational view, with parts broken away, showing a rotary lawn mower attachment tractively coupled to the front portion of the tractor chassis and its blade receiving driving torque from the power source of the tractor; and FIGURE 6 is a view similar to FIGURE 5, but showing a snow thrower attachment tractively coupled to the front of the tractor chassis with its rotor drive shaft driven from the power source of the tractor.

Referring now more particularly to the accompanying drawings, the tractor of this invention comprises an elongated chassis 5 carrying steerable wheels 6 at its front and drive wheels 7 at its rear. The front wheels 6 are mounted on the opposite ends of a transverse front axle 8 of tubular construction, which is rigidly fixed to the front portion of the chassis 5 at its underside; and the drive wheels 7 are located at the opposite ends of a rear axle structure 9 which includes a substantially upright gear case 10 intermediate the drive wheels. The gear case has an upwardly and forwardly projecting portion 11 with bracket means 12 thereon to support a substantially horizontal deck 13 and a seat 14 for an operator of the tractor, located substantially directly over the rear wheels.

The chassis 5 is supported by its wheels at an elevation sufficiently high as to accommodate a rotary lawn mowing attachment 15 therebeneath, as seen in FIGURE 5, in the space between the front and rear wheels of the tractor.

The chassis 5 comprises a relatively short forwardly extending rear chassis section 16 which includes the gear case 10 and the bracket means 12 on its upwardly and forwardly extending portion 11. For this purpose, the bracket means comprises a pair of plates 17 and 18 secured to opposite sides of the upper portion 11 of the gear case and extending forwardly therefrom in parallel relationship to one another. The bracket means also includes a second pair of plates 19, welded or otherwise secured to the plates 17 and 18 and extending upwardly therefrom, which have the rear deck 13 affixed to their upper edges.

The front portion of the chassis 5 is provided by an elongated frame 21 having its rear directly forwardly adjacent to the front edges of the brackets 17 and 18 on the gear case. The frame is of channel-shaped cross section having its web 22 uppermost and having depending side flanges 23 spaced from one another transversely of the chassis. The front axle 8 is welded to the channel flanges 23, in notches cut in their outer end portions as seen best in FIGURE 5.

The front and rear chassis sections are secured together at their adjacent ends by a unique swivel joint connection 24 that enables the front and rear axles of the tractor to tilt from side to side relative to one another about an axis that extends generally fore and aft of the chassis. Though the swivel axis lies in a vertical plane containing the longitudinal center line of the tractor, it is inclined upwardly and forwardly from the rear chassis section 16 so as to intersect the web 22 of the frame at a location rearwardly of the front wheels 6, for a purpose to be described shortly.

The swivel joint connection 24 comprises bearing brackets 25 and 26 that are respectively affixed to the underside of the rear portion of the frame 21 and to the forwardly extending portions of the plates 17 and 18, between the latter, and which cooperate to receive and rotatably journal a tilt pin 27. Consequently, either the front or the rear section of the chasis can tilt from side to side relative to the other chassis section whenever the tractor wheels ride over uneven ground so as to minimize the danger of twisting or wraping of the chassis framework as would be the case if the latter were rigid from one end to the other thereof.

At the forward portion of the frame 21, its web 22 is formed to provide a horizontal engine supporting platform 29, just rearwardly of the front axle 8, upon which a vertical shaft internal combustion engine 30 is seated and secured as by means of bolts 31. The crankshaft 32 of the engine projects downwardly through a hole (not shown) in the platform 29 to have its lower end portion disposed at the underside of the frame web. A V-belt drive pulley 33 and a similar V-belt power take off pulley 34 are affixed to this lower end portion of the crankshaft, with the drive pulley above the power take off pulley and thus closer to the frame web.

The drive pulley, of course, provides for the transmission of driving torque to the rear wheels 7, as will be described later on; and the power take off pulley 34 provides for the transmission of driving torque to the rotatable work performing element of an implement such as a lawn mower or a snow thrower that may be tractively coupled to the front portion of the chassis in a manner also to be described later.

Attention is directed to the fact that the verical shaft engine, which is of the single cylinder air cooled type, is mounted on the supporting platform 29 with its crankcase 35 rearmost and its cylinder 36 extending forwardly therefrom toward the front of the tractor, and near the bottom of the engine. It has a flywheel-impeller 37 that is secured to the upper end of its crankshaft so as to be located at the top of the engine. Cooling air set in motion by the flywheel-impeller is thus drected downwardly across the finned surfaces on the cylinder and its head, and onto a forwardly and downwardly inclined web portion 38 of the frame ahead of the engine supporting platform 29, from whence the air can be deflected forwardly to the front of the tractor. While it is advantageous to mount the engine forwardly remote from an operator occupying the seat 14 in the manner described, it is a further feature that cooling air heated by its passage downwardly across the cylinder and head of the engine is deflected forwardly by the inclined web portion 38, and hence away from an operator occupying the seat on the rear of the tractor.

It should be noted that the frame 21 slopes downwardly toward the front axle 8 so that its forward portion is at a substantially minimum distance above ground level. This, together with the provision of a vertical shaft engine that is mounted upon the low front portion of the frame, not only assures a desirably low center of gravity and silhouette, but makes possible a degree of compactness of construction that is unique in riding tractors of the type herein concerned.

An additional feature of the construction described thus far is that the location and upward and forward slant of the axis of the swivel joint connection 24, with passage of the axis upwardly through the engine supporting platform 29, minimizes the overbalancing effect the engine might have upon the tractor as its frame tilts sidewise in either direction as a consequence of the front wheels 6 riding over uneven ground. An exceptional degree of stability is thus assured.

A steering wheel 51, mounted on the upper end of a steering column 52 that projects through an instrument panel 46, connects with the front wheels 6 through suitable steering linkage 53 to enable the operator to turn the front wheels in one direction or the other and thus control the direction of travel of the tractor.

The rear axle structure comprising the gear case 10, and the differential and speed and directional change gearing in the gear case, are fully illustrated and described in my above mentioned copending application Ser. No. 307,382, now Patent No. 3,311,186, to which reference may be made for details of these parts of the tractor.

The speed and direction change gear train incorporated in the gear case 10 includes an input shaft 68 that is journaled in bearings carried by the opposite side walls of the gear case for rotation on an axis parallel to that of the rear axle. One end of the input shaft projects to the exterior of the gear case where it has a substantially large diameter input pulley 69 detachably fixed thereon.

Driving torque is transmitted from the drive pulley 33 on the lower end portion of the engine crankshaft to the input shaft 68 of the speed and direction change gearing by flexible endless transmission means comprising a pair of endless belts 87 and 88. These belts cooperate with a pair of axially adjacent idler pulleys 89 and 90 that are fixed together and rotate freely upon an idler shaft 91 that is vertically secured in the web 22 of the channel shaped frame at a location between the flanges 23 of said frame and just forwardly of the swivel joint connection 24. The pulley 89 is somewhat smaller than the pulley 90, and it is located directly below the web of the frame and at a level only slightly below the top of the large pulley 69 on the input shaft 68 of the transmission gearing. The endless belt 88 is trained around the upper idler pulley 89 and around the input pulley 69 with a quarter twist in the belt due to rotation of the latter pulley about a horizontal axis.

The belt 88 has a length great enough to enable both stretches thereof to extend rearwardly toward the input pulley 69 in nearly side by side relationship so as to be as close as possible to the underside of the frame and thus clear the swivel joint connection 24 between the front and rear chassis sections. The slack in the belt is taken up by a belt tightener idler pulley 93 that engages the underside of that stretch of the belt which comes forwardly off of the lower peripheral portion of the the input pulley 69. The pulley 93 is located directly in front of the input pulley, and it is freely rotatably journaled on the rear portion of an arm 94 that has its front portion pivotally mounted on a stud 95 fixed in the plate 18 on the front of the gear case.

A tension spring 96 is connected between the free end of the arm 94 and one of the seat supporting brackets 19 at all times holds the arm swung upwardly to lift and tension the lower stretch of the belt 88, and thus maintain the belt in good torque transmitting relationship with the pulleys 69 and 89.

Figure 3:
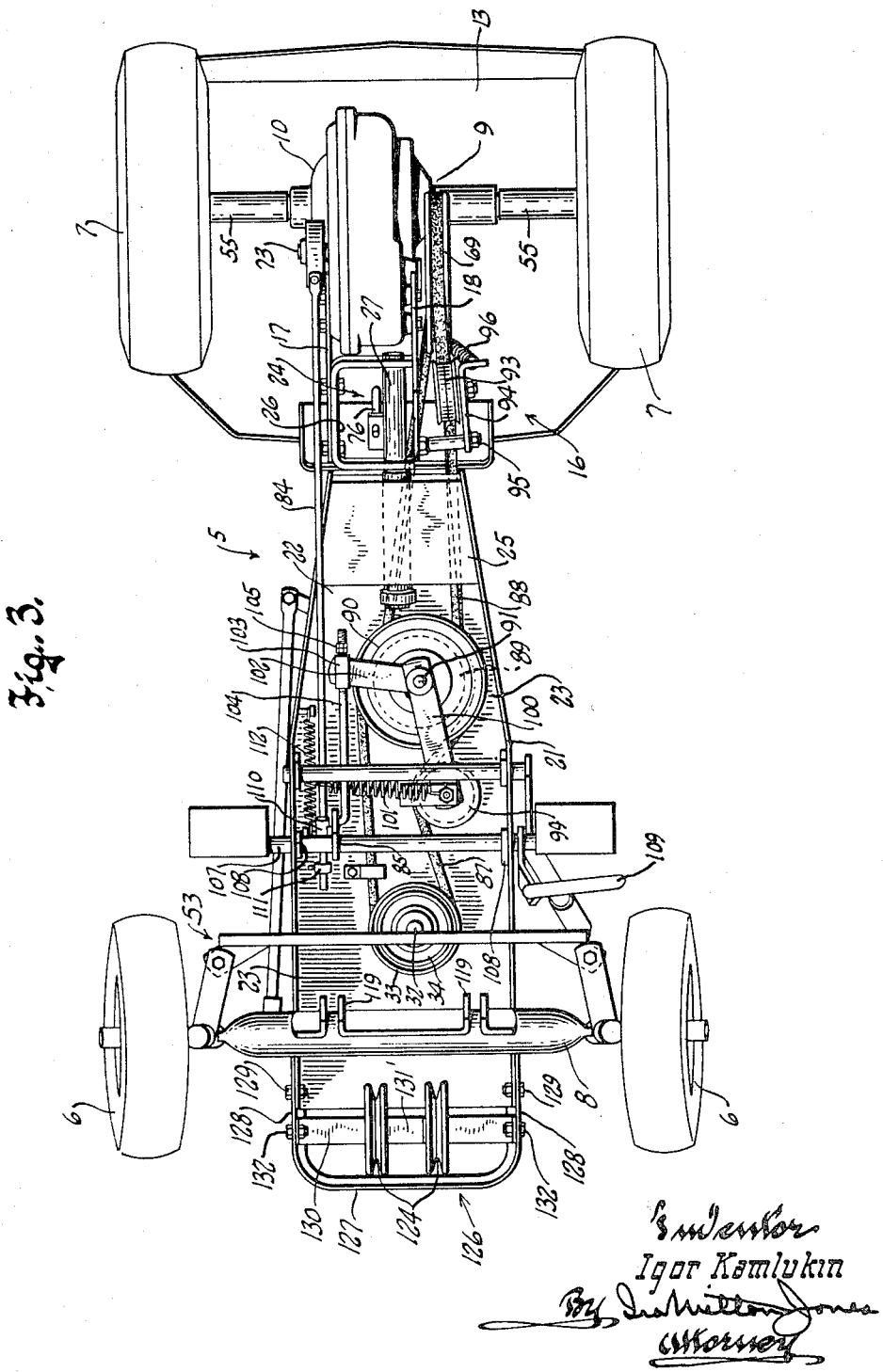
FIGURE 3 is a view looking at the underside of the tractor.
Figure 4:
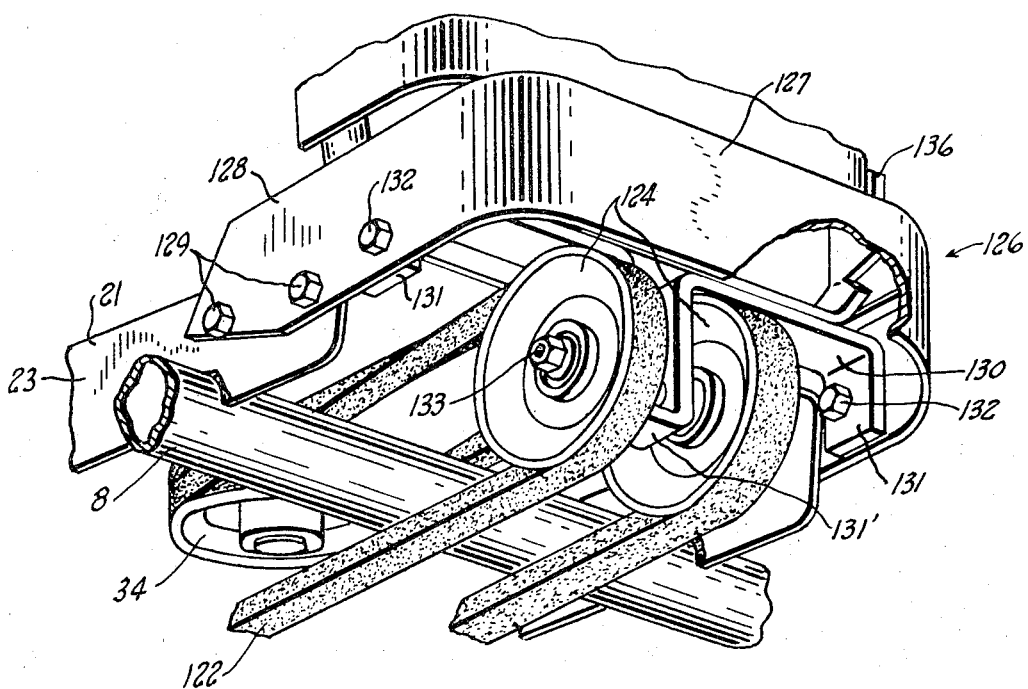
FIGURE 4 is a fragmentary perspective view of the power take off means and part of the belting used to drive the blade of a rotary lawn mower attachment that may be tractively coupled to the tractor chassis.

The other belt 87 is trained about the remaining pulley 90 on the idler shaft and about the drive pulley 33 on the engine crankshaft, and thus cooperates with the belt 88 to transmit rotation from the engine crankshaft to the input pulley 69. As seen best in FIGURE 3, the belt 87 also has a length such as to normally loosely nondrivingly engage around the pulleys 33 and 90 and to thus enable a manually movable belt tightener pulley 99 to control the transmission of driving torque from the engine to the input shaft 68 of the transmission gearing.

The belt tightener pulley 99 is freely rotatably mounted on the forward outer end of an arm 100 which has its rear end swingably journaled upon the lower end portion of the idler shaft 91. In its "drive" position, the pulley 99 bears inwardly upon one of the stretches of the belt 87 to hold it in driving engagement with the pulleys encircled thereby, and it is normally biased to its "drive" position by a tension spring 101, connected between the outer end of the arm 100 and the brake rod 84, as seen best in FIGURE 3.

Another arm 102 that is fixed to the arm 100 at its pivoted end extends transversely from the idler shaft 91 and its carries a swivel block 103 at its outer end. The rear end portion of a clutch rod 104 passes loosely through a bore (not shown) in the swivel block and has a pair of lock nuts 105 threaded thereon a short distance behind the swivel block. These nuts are carried into engagement with the swivel block when the clutch rod is pulled forwardly, to cause the belt tightener pulley 99 to be swung counterclockwise out of its "drive" position shown. This, of course, slackens the belt 87 and disrupts the transmission of driving torque to the rear wheels of the tractor. As soon as the clutch rod 104 is released, the tension spring 101 again swings the idler pulley inwardly to its "drive" position so that the transmission of driving torque from the engine to the rear wheels of the tractor is resumed.

Figure 1:
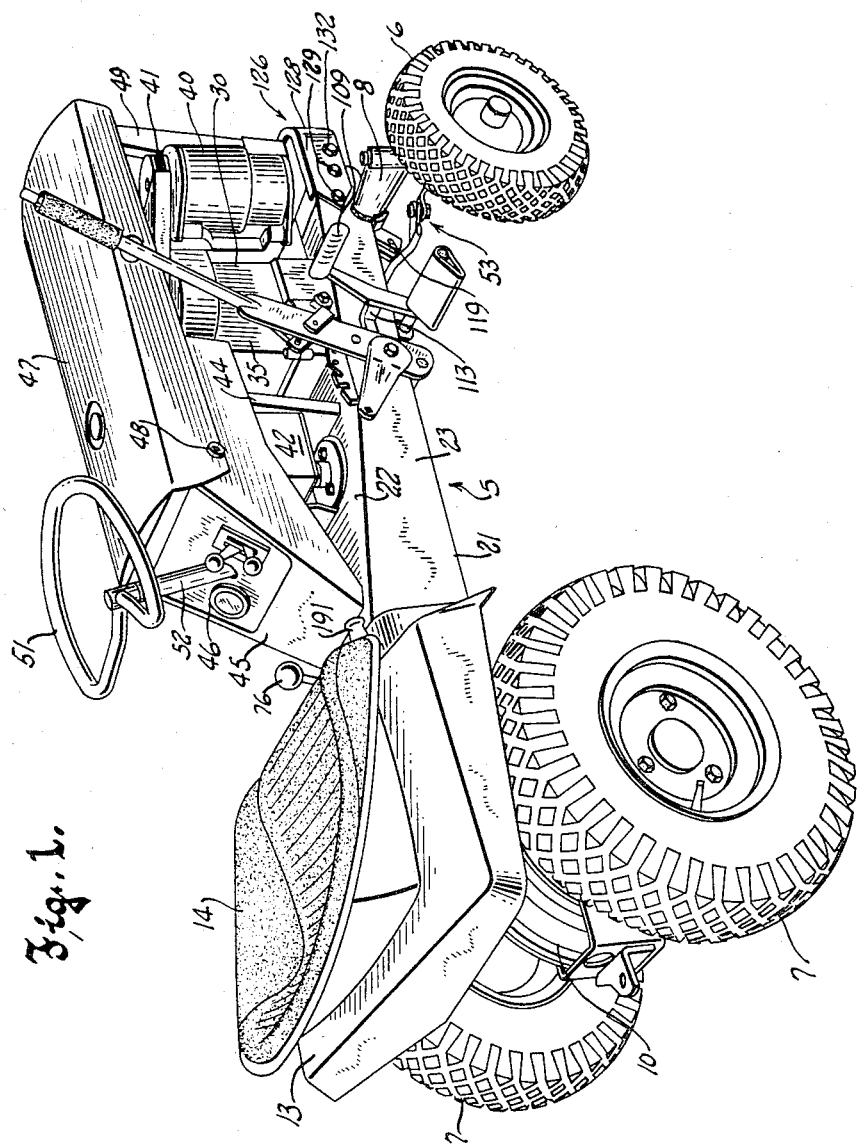
FIGURE 1 is a perspective view of the tractor of this invention, showing one side thereof.
Figure 2:
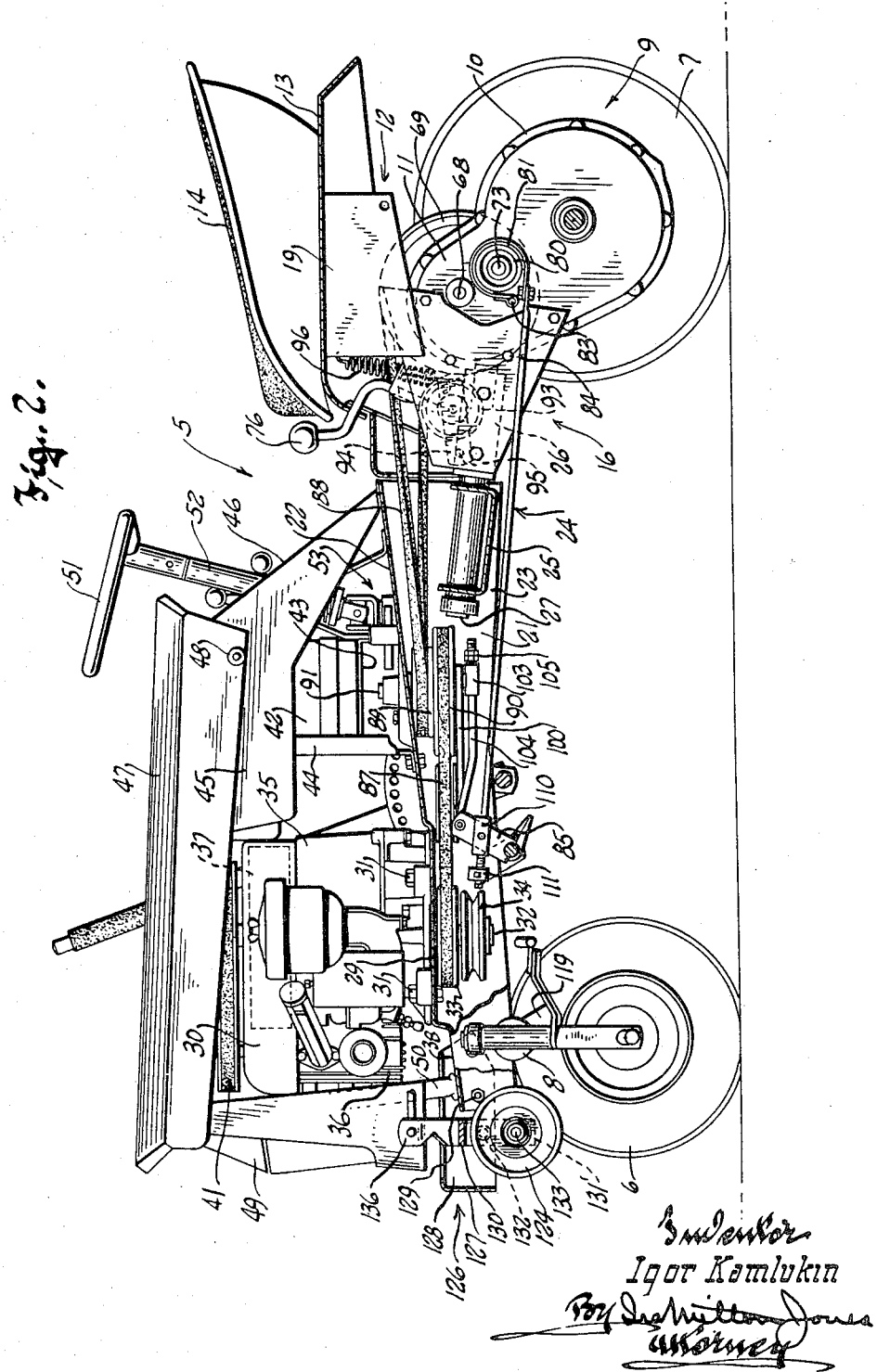
FIGURE 2 is an elevational view of the other side of the tractor, parts thereof being broken away and shown in section.

The forward end of the rod 104 is connected to the outer end of a lever 85 that is in turn secured to a cross shaft 107 having its opposite end portions freely rotatably journaled in cleats 108 fixed to the and depending from the flanges 23 of the channel shaped frame. The cleats mount the cross shaft at a location a short distance behind the front axle 8, and slightly rearwardly of the lower end portion of the engine crankshaft. Consequently, when the cross shaft 107 is rocked in the counterclockwise direction seen in FIGURES 2 and 3, the rod 104 is pulled forwardly by the lever 85 to effect disruption of the drive from pulley 33 to pulley 90. Such rocking motion is imparted to the cross shaft by means of a foot pedal 109 (see FIGURE 1) that is secured to an end portion of the cross shaft that extends outwardly beyond one side of the frame.

The foot pedal 109 is not only intended to serve as a clutch pedal to provide for declutching, or disruption of the torque transmitting connection between the engine drive pulley 33 and the pulley 90 on the idler shaft, but when depressed forwardly far enough, it also actuates a brake mechanism, as described in my aforesaid copending application Ser. No. 307,382, now Patent No. 3,311,186 to slow and/or stop both forward and reverse movement of the tractor.

As mentioned previously, the space between the front and rear wheels of the tractor, beneath the frame thereof, can accommodate the rotary lawn mower 15 seen in FIGURE 5. The mower may be of conventional construction having one or more blades that rotate in a horizontal plane, and having a vertical drive shaft with an input pulley 115 fixed thereto at the top of the mower housing. At its rear, the mower is supported by ground engaging rollers 116 that rotate on a common transverse axis.

The rotary mower can be readily tractively coupled to the front portion of the tractor chassis, and for this purpose, its housing carries a pair of arms 118 that extend upwardly and forwardly to have their forward extremities received between and connected to pairs of ears 119 which are fixed to a tubular front axle 8 and extend downwardly and slightly rearwardly therefrom. Pins 120 passing through suitable holes in the ears 119 and through the forward extremities of the arms 118 provide pivotal connections between the mower and the chassis through which the mower is pulled along with the tractor while being free to tilt up and down relative thereto on the pins 120.

The disposition of the rotary mower 15 behind the front axle 8 disposes the input pulley 115 of the former a short distance behind and below the power take off pulley 34 on the engine crankshaft. Driving torque is transmitted from the power take off pulley 34 to the mower input pulley 115 by means of a single endless belt 122. This belt is trained around both pulleys 34 and 115 and its opposite stretches extend forwardly therefrom, to have intermediate portions trained over a pair of idler pulleys 124 that are freely rotatably carried by the chassis of the tractor for rotation on a transverse axis located in spaced relation to both the pulleys 34 and 115, lengthwise of the chassis. While the idler pulleys 124 could be located rearwardly of both the power take off pulley 34 and the mower input pulley 115, in the present instance they have been shown as positioned forwardly of them, and ahead of the axle 8. Consequently, the idler pulleys 124 are located at the extreme front of the chassis, preferably with their tops at the same level as that of the power take off pulley 34.

With the idler pulleys 124 in the location described, each stretch of the belt 122 extends forwardly from the power take off pulley 34, passes over the top of one of the two idler pulleys 124 and then extends rearwardly from the lower edge portion of its idler pulley to the mower input pulley 115.

Although the idler pulleys 124 may be supported directly from the front portion of the frame 21, they have here been illustrated as comprising part of a subassembly that consists of a substantially U-shaped frame extension 126 having its bight 127 extending transversely across the front of the tractor and spaced slightly forwardly of the front extremity of the chassis frame, and opposite side members 128 that extend rearwardly from the extremities of the bight. The side members overlie the outer sides of the flanges 23 on the front of the chassis frame, to which the frame extension is rigidly secured as by means of bolts 129 that pass through the side members 128 and the flanges 23. It will be apparent, therefore, that the U-shaped frame extension 126 provides a bumper, the bight 127 of which constitutes the foremost part of the tractor.

The subassembly also includes a pulley carrier 130 which extends transversely across the space between the opposite side members 128 of the bumper and has downwardly turned end portions 131 which overlie the inner surfaces of the side members. Each end portion 131 of the carrier is connected to its adjacent side member 128 by a single bolt 132, and since the two bolts align on a common transverse axis they provide a pivot about which the carrier may oscillate.

A downwardly extending medial portion 131' of the carrier projects between the two idler pulleys 124 and provides what may be termed an inverted fork that carries a short axle 133, the opposite ends of which project from the fork to support the idler pulleys.

The axle carrying the idler pulleys is located a distance below the axis about which the carrier swings, with the result that the idler pulleys 124 are not only freely rotatable on a transverse axis a short distance directly ahead of the front axle 8, but they are also bodily movable fore and aft, or more particularly, toward and from the power take off pulley 34 on the lower end portion of the engine crankshaft. Consequently, the idler pulleys can be swung forwardly to the belt tensioning position seen in FIGURE 5 at which the belt 122 is operable to transmit driving torque from the power take off pulley 34 to the mower input pulley 115, for operation of the mower. Similarly, the idler pulleys 124 can be swung rearwardly to a slack belt position, not shown, at which the belt 122 loosely engages the power take off pulley 34 and the mower input pulley 115, to disrupt the driving connection therebetween. This arrangement, therefore, not only provides an exceptionally simple way of transmitting driving torque from the vertically disposed crankshaft of the engine 30 to the vertically disposed drive shaft of the rotary mower, but it also provides for control of the drive to the mower shaft entirely independently of the drive to the rear wheels of the tractor.

A hand lever 134 pivotally mounted as at 135 on an upstanding bracket 44 at the left side of the tractor near the instrument panel 46, enables an operator of the tractor to swing the belt tightener or idler pulleys 124 bodily forwardly or rearwardly, toward and from their operative positions. For this purpose, the pulley carrier 130 has an arm 136 fixed thereto and extending upwardly therefrom along the inner side of the bumper side member 128 at the left side of the tractor. A control rod 137 connects the arm 136 with the hand lever 134, so that rearward movement of the latter causes the pulley carrier to swing in the direction to carry the idler pulleys forwardly, thus tensioning the belt 122 into good driving engagement with the power take off pulley 34 and the mower input pulley 115. If the lever 134 is moved forwardly about its pivot 135, it effects reverse swinging of the carrier 131 and bodily movement of the belt tightener pulleys 124 toward the power take off pulley 34 to slacken the belt and disrupt the driving connection between the pulley 34 and the mower input pulley 115.

The described location of the idler or belt tightener pulleys 124 is also advantageous for the reason that it enables the same belt 122 to be used for the transmission of driving torque from the power take off pulley 34 to the drive shaft 140 of a snow thrower 141 that may be tractively coupled to the chassis ahead of the tractor, as seen in FIGURE 6.

In this case the tractive connection between the snow thrower and the front portion of the tractor chassis comprises a sub-frame generally designated 142 which is readily detachably connected to the tractor chassis in a manner to be described shortly. The subframe is generally of U-shaped configuration in that it has a bight 143 which extends transversely of the tractor chassis, under the front portion thereof and near the power take off pulley 34, and opposite arms 144 which extend forwardly and downwardly under the axle 8 a distance slightly beyond the bight 127 of the bumper. The front portions of these arms embrace and are detachably secured by bolts 147 to a rearwardly extending housing portion 146 on the snow thrower. The sub-frame 142 is readily detachably connected to the under side of the tractor chassis by means which comprises the mower attaching ears 119 described previously, and a pair of links 148. Lugs 148′ on the arms 144 of the sub-frame extend upwardly therefrom between the pairs of ears 119 on the axle 8, and are detachably secured thereto by the pins 120.

Each of the links 148 extends downwardly between one of the flanges 23 of the chassis frame and the arm 144 of the subframe therebeneath, and has its opposite end portions flatwise overlying said frame portions and secured thereto by bolts 149.

A bracket 150 secured to the bight 143 of the subframe extends forwardly therefrom to have another idler pulley 151 mounted thereon for rotation about an upright axis and at a location a short distance beneath the power take off pulley 34.

The idler pulley 151 more or less takes the place of the mower input pulley 115 in its relation to the idler pulleys 124 and the belt 122 which, it will be noted, is here also trained around the power take off pulley 34 and another pulley 151 that rotates about an upright axis and is located beneath the power take off pulley. Since the idler pulley 151 is located much closer to the front axle 8, however, one of the stretches of the belt 122 after passing over its idler pulley 124, can be pulled forwardly and engaged around an input pulley 152 on the end of the drive shaft 140 for the snow thrower. The drive shaft 140, of course, is arranged to rotate on a transverse axis at the rear of the thrower, spaced forwardly and downwardly of the idler pulleys 124.

In more or less conventional fashion, the rotor drive shaft is connected to the rotor shaft 154 ahead of it by a chain 155 trained around sprockets 156 and 157 on the rotor drive and rotor shafts, respectively.

With the arrangement described, therefore, one stretch of the endless belt 122 extends forwardly over the top of one of the idler pulleys 124 from the power take off pulley 34, and then rearwardly from the underside of that idler to the other idler pulley 151. The other stretch of the belt extends forwardly from the power take off pulley 34 over the top of the other idler pulley 124, downwardly and forwardly around the input pulley 152 on the rotor drive shaft 140, and then back to the rear idler pulley 151.

Again in this case the same hand lever 134 described previously enables the idler or belt tightener pulleys 124 to be swung bodily toward and from the power take off pulley 34 to thus control the transmission of driving torque from the power take off pulley 34 to the rotor drive shaft 140, entirely independently of whether or not driving torque is being transmitted from the engine to the rear wheels of the tractor.

A unique feature of the power take off described is that its two idler pulleys 124 enable the input shaft of an implement or attachment ahead of the tractor to be driven in either direction, depending upon which stretch of the belt 122 is drawn forwardly from the idler pulleys for engagement with the input pulley of the attachment.

From the foregoing description, together with the accompanying drawings, it will be readily apparent to those skilled in the art that this invention provides a riding tractor featuring a power source comprising a low cost vertical shaft engine and having a low silhouette and center of gravity with improved stability as a result, together with power take off means that simplifies the transmission of driving torque to the work performing elements of implements that may be tractively coupled to the tractor and gives greater freedom of movement to the implements than was possible heretofore.

What is claimed as my invention is:

1. In combination:
   (A) a tractor having a chassis with front and rear mounted wheels, and an internal combustion engine to supply driving torque to the rear wheels;
   (B) an engine driven power take off pulley mounted on the underside of the chassis and constrained to rotate on an upright axis;
   (C) an implement ahead of the tractor and tractively coupled to the chassis thereof, said implement having an input pulley which rotates on a transverse axis located ahead of the front wheels and a distance below the level of said power take off pulley;
   (D) and means for transmitting driving torque from the power take off pulley to said implement pulley, comprising,
      (1) a pair of coaxial idler pulleys carried by the chassis for free rotation on a transverse axis with the pulleys located upwardly and rearwardly from the implement pulley but forwardly of the power take off pulley,
      (2) another idler pulley carried by the chassis under the power take off pulley and freely rotatable about an upright axis,
      (3) and an endless belt trained about the power take off pulley and said other idler pulley and having opposite stretches common to both of said last named pulleys and extending forwardly therefrom, one of said stretches passing forwardly around one of said pair of coaxial idler pulleys, and the other stretch passing over the implement pulley and the other of said pair of coaxial idler pulleys.

2. The combination of claim 1, further including:
   (A) a carrier on which said pair of idler pulleys is mounted;
   (B) and means mounting the carrier on the tractor chassis for pivotal motion about a transverse axis spaced vertically from the axis on which said pair of idler pulleys rotate, to thus enable the same to be swung bodily toward and from the power take off pulley, between tight belt and slack belt positions.

3. The combination of claim 1, further including:
   (A) a subframe detachably connected to the front portion of the tractor chassis and extending rearwardly thereunder;
   (B) means on the rear portion of the subframe freely rotatably mounting said other idler pulley;
   (C) and means detachably connecting said implement to the front portion of the subframe so that the implement is tractively coupled to the tractor chassis through the subframe.

4. In combination:
   (A) a tractor having a chassis with front and rear mounted wheels;
   (B) a power source on the front portion of the chassis comprising an internal combustion engine from which the rear wheels are driven, said engine having a vertical crankshaft, a lower portion of which is disposed at the underside of the chasis;
   (C) a snow thrower tractively coupled to the chassis ahead of the tractor, said snow thrower having a rotor, a drive shaft for the rotor that rotates on a transverse axis directly ahead of the front wheels of the tractor, and an input pulley on the drive shaft;
   (D) and means to transmit driving torque from the engine crankshaft to said input pulley, comprising (1) a power take off pulley fixed on said lower portion of the engine crankshaft,
(2) an idler pulley carried by the tractor chassis for rotation about an upright axis, and at a location near to but below the power take off pulley,
(3) a pair of other idler pulleys carried by the tractor chassis for rotation about a transverse axis above and rearwardly of said input pulley but forwardly of the power take off pulley,
(4) and an endless belt trained about said first mentioned idler pulley and the power take off pulley, said belt having opposite forwardly extending stretches one of which has an intermediate portion trained around one of said pair of idler pulleys, and the other stretch of the belt having an intermediate portion trained around the thrower input pulley and the other of said pair of idler pulleys.

5. A tractor of the type characterized by a chassis comprising a fore and aft extending frame, a front axle fixed to the underside of the frame at its front portion and having wheels at its opposite ends, and a rear axle structure supporting the rear of the frame and having drive wheels at its opposite ends, characterized further in that:
(A) the frame extends forwardly a short distance past the front axle and has a channel shaped cross section, with its web disposed uppermost and its flanges extending downwardly;
(B) the chassis includes a bumper which extends across the front of the tractor and has opposite side members that overlie the frame flanges and provide forward extensions thereof;
(C) fastening means secure the side members of the bumper to the underlying flanges of the frame;
(D) an internal combustion engine is seated upon and secured to the web of the frame, at the front portion thereof, and has a crankshaft that extends downwardly through the web, behind the front axle, so that the lower end portion of the crankshaft is disposed beneath the web and between the frame flanges;
(E) a power takeoff pulley is fixed on said lower end portion of the engine crankshaft;
(F) a pulley carrier is pivotally mounted on said side members of the bumper for motion in opposite directions about a transverse axis located forwardly of the front axle,
so that the bumper and the carrier with said idler pulleys thereon constitute a subassembly that can be secured to the front of the frame as a unit by said fastening means;
(G) and a pair of belt tightener pulleys is mounted on said carrier, ahead of the power takeoff pulley, for rotation on a common axis which is parallel to and below the carrier pivot axis,
so that said belt tightener pulleys are movable bodily toward and from the power takeoff pulley when the carrier is swung back and forth about its pivot axis, said belt tightener pulleys being adapted for cooperation with the stretches of an endless power takeoff belt trained about the power takeoff pulley to tighten the belt and establish a driving relationship between it and the power takeoff pulley in consequence of movement of the belt tightener pulleys away from the power takeoff pulley, and to loosen the belt and disrupt the driving relationship between it and the power takeoff pulley in consequence of movement of the belt tightener pulleys toward the power takeoff pulley.

6. In a tractor of the type having a chassis supported by spaced front and rear wheels:
(A) a power takeoff pulley located under the chassis;
(B) and means on the chassis providing for the establishment of a readily disruptable driving connection between said pulley and a driven element of an implement that may be tractively coupled to the chassis, comprising
(1) a single endless belt trained around the power takeoff pulley and having opposite stretches extending in one direction therefrom,
(2) a pair of freely rotatable idler pulleys over which said stretches of the belt engage, said idler pulleys being mounted at the front portion of the chassis, forwardly of the power takeoff pulley, for rotation on transverse axes,
(3) means mounting at least one of said idler pulleys for bodily movement relative to the power takeoff pulley from a tight belt driving position to a slack belt non-driving position,
(4) another pulley about which the belt is trained,
(5) means mounting said other pulley for rotation about an upright axis at a location rearwardly of said pair of idler pulleys,
(6) a manually operable actuator movably mounted on the chassis,
(7) and a link through which motion is transmitted from the actuator to said bodily movable idler pulley, to provide for rapidly moving the latter back and forth between its tight and slack belt positions.

References Cited

UNITED STATES PATENTS

| | | | |
|---|---|---|---|
| 2,536,148 | 1/1951 | Andrews | 280—111 |
| 2,736,389 | 2/1956 | Phelps | 74—242.15 |
| 1,492,771 | 5/1924 | Adsit. | |
| 2,442,731 | 6/1948 | Paul | 172—125 |
| 2,711,624 | 6/1955 | Crump | 56—25.4 |
| 2,766,835 | 10/1956 | Witt | 172—125 |
| 2,838,124 | 6/1958 | Cramer | 56—25.4 |
| 2,859,579 | 11/1958 | Peck | 56—25.4 |
| 2,862,343 | 12/1958 | Wood | 56—25.4 |
| 2,901,257 | 8/1959 | Teagle | 56—25.4 |
| 2,924,928 | 2/1960 | Rhoades et al. | 56—25.4 |
| 2,949,004 | 8/1960 | Jones | 56—25.4 |
| 2,991,612 | 7/1961 | Holmes | 56—25.4 |
| 3,003,574 | 10/1961 | Strunk | 56—25.4 |
| 3,008,282 | 11/1961 | Brownlee et al. | 56—25.4 |
| 3,038,288 | 6/1962 | Deptula et al. | 56—25.4 |

ROBERT E. PULFREY, *Primary Examiner.*

EUGENE H. EICKHOLT, *Assistant Examiner.*

U.S. Cl. X.R.

56—25.4; 180—53